United States Patent
Ebrahimi Afrouzi et al.

(10) Patent No.: US 11,458,628 B1
(45) Date of Patent: *Oct. 4, 2022

(54) METHOD FOR EFFICIENT OPERATION OF MOBILE ROBOTIC DEVICES

(71) Applicants: Ali Ebrahimi Afrouzi, San Diego, CA (US); Chen Zhang, Richmond (CA)

(72) Inventors: Ali Ebrahimi Afrouzi, San Diego, CA (US); Chen Zhang, Richmond (CA)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/109,868

(22) Filed: Dec. 2, 2020

Related U.S. Application Data (63) Continuation of application No. 15/976,853, filed on May 10, 2018, now Pat. No. 10,882,186.

(60) Provisional application No. 62/505,060, filed on May 11, 2017.

(51) Int. Cl.
*B25J 9/16* (2006.01)
*B25J 11/00* (2006.01)

(52) U.S. Cl.
CPC ......... *B25J 9/1666* (2013.01); *B25J 11/0085* (2013.01); *Y10S 901/01* (2013.01); *Y10S 901/02* (2013.01)

(58) Field of Classification Search
CPC .... B25J 9/1666; B25J 11/0085; Y10S 901/02; Y10S 901/01
USPC .................................................. 700/245–264
See application file for complete search history.

(56) References Cited

U.S. PATENT DOCUMENTS

| | | | |
|---|---|---|---|
| 5,293,955 A | 3/1994 | Lee | |
| 5,995,884 A * | 11/1999 | Allen | G05D 1/0234 701/25 |
| 6,594,844 B2 | 7/2003 | Jones | |
| 7,155,308 B2 | 12/2006 | Jones | |
| 7,430,455 B2 | 9/2008 | Casey | |
| 8,380,350 B2 * | 2/2013 | Ozick | A47L 9/0477 700/250 |
| 9,233,472 B2 * | 1/2016 | Angle | H04L 67/325 |
| 9,603,499 B2 * | 3/2017 | Friedman | A47L 9/009 |
| 9,802,322 B2 * | 10/2017 | Angle | G06Q 20/202 |
| 10,168,709 B2 | 1/2019 | Kleiner | |
| 10,310,507 B2 | 6/2019 | Kleiner | |
| 11,119,496 B1 * | 9/2021 | Ebrahimi Afrouzi | G05D 1/0217 |
| 2005/0010331 A1 | 1/2005 | Taylor | |
| 2010/0037418 A1 * | 2/2010 | Hussey | G05D 1/0234 901/1 |
| 2013/0184980 A1 | 7/2013 | Ichikawa | |
| 2014/0207281 A1 | 7/2014 | Angle | |
| 2014/0207282 A1 * | 7/2014 | Angle | G06Q 10/1095 901/1 |
| 2015/0212520 A1 * | 7/2015 | Artes | A47L 11/4011 701/2 |

(Continued)

*Primary Examiner* — Jaime Figueroa (57) ABSTRACT

A method for a robot to autonomously plan a navigational route and work duties in an environment of the robot including accessing historical sensor data stored from prior work cycles, determining the navigational route and work duties of the robot by processing probabilities based on the historical sensor data, enacting the navigational route and work duties by the robot, capturing new sensor data while the robot enacts the navigational route and work duties, processing the new sensor data, and altering the navigational route and work duties based on the new sensor data processed.

20 Claims, 5 Drawing Sheets

(56) References Cited

U.S. PATENT DOCUMENTS

| | | | |
|---|---|---|---|
| 2016/0167234 A1* | 6/2016 | Angle | G06Q 20/12 |
| | | | 701/2 |
| 2016/0271795 A1* | 9/2016 | Vicenti | G05D 1/0274 |
| 2016/0309973 A1 | 10/2016 | Sheikh | |
| 2017/0049288 A1 | 2/2017 | Knutson | |
| 2017/0192435 A1 | 7/2017 | Bakhishev | |
| 2018/0074508 A1 | 3/2018 | Kleiner | |
| 2018/0211103 A1 | 7/2018 | Sohn | |
| 2018/0272540 A1* | 9/2018 | Cronin | B25J 11/0085 |
| 2018/0284786 A1 | 10/2018 | Moshkina-Martinson | |
| 2018/0311822 A1 | 11/2018 | Kaminka | |
| 2019/0320867 A1 | 10/2019 | Noh | |
| 2020/0047337 A1 | 2/2020 | Williams | |
| 2020/0047343 A1 | 2/2020 | Bal | |

\* cited by examiner

METHOD FOR EFFICIENT OPERATION OF MOBILE ROBOTIC DEVICES

CROSS-REFERENCE TO RELATED APPLICATIONS

This application is a Continuation of U.S. Non-Provisional patent application Ser. No. 15/976,853, filed May 5, 2018 which claims the benefit of U.S. Provisional Patent Application No. 62/505,060, filed May 11, 2017, each of which is hereby incorporated by reference.

FIELD OF THE DISCLOSURE

The disclosure relates to mobile robotic devices generally and more specifically to how mobile robotic devices operate in a work environment.

BACKGROUND

Sensory detection is important for mobile robotic devices. Mobile robotic devices must be able to detect obstacles to avoid running into them and damaging the obstacle or the robotic device itself. Additionally, changes in surface type that a mobile robotic device operates on can impact the functions of the robot. For example, a robot may not be able to operate effectively on a particular type of surface. Surface types may also impact the functions a robot can partake in. Inefficiencies in the prior art remain. A need exists for mobile robotic devices to be able to autonomously plan the most efficient work operational plan through a work environment that incorporates considerations regarding the status of the work environment itself.

SUMMARY

The following present a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

One aspect includes a method for a robot to autonomously plan a navigational route and work duties in an environment of the robot, including: accessing, with a processor of the robot, historical sensor data stored from prior work cycles, wherein the historical sensor data is indicative of at least one of: a map of an environment of the robot and one of: types of work surfaces in areas of the environment, locations of rooms in the environment, locations of obstacles in the environment, presence and absence of dynamic obstacles in areas of the environment at different times, a location of a charging station of the robot, an amount of debris accumulation in areas of the environment, an activity level in areas of the environment at different times, a battery power level of the robot, or a last date of operation in areas of the environment; determining, with the processor, the navigational route and work duties of the robot by processing probabilities based on the historical sensor data; enacting, with the robot, the navigational route and work duties; capturing, with at least one sensor of the robot, new sensor data while enacting the navigational route and work duties; processing, with the processor, the new sensor data; and altering, with the processor, the navigational route and work duties based on the new sensor data processed.

Another aspect includes a robot including a tangible, non-transitory, machine readable medium storing instructions that when executed by a processor of the robot effectuates the operations described above.

Another aspect includes a tangible, non-transitory, machine readable medium storing instructions that when executed by a processor effectuates the operations described above.

BRIEF DESCRIPTION OF DRAWINGS

Non-limiting and non-exhaustive features of the present invention are described with reference to the following figures, wherein like reference numerals refer to like parts throughout the various figures.

DETAILED DESCRIPTION OF SOME EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

The term "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

The term "dynamic obstacle" shall hereinafter mean obstacles in a work environment that were not present in a prior operating cycle but are now present in a current operating cycle as well as obstacles that are present in a current operating cycle that were not present previously. Further "dynamic obstacle" will be intended to mean any and all obstacles that are moving at the time of operation including but not limited to pets, humans, other mobile robotic devices and the like. Additionally, obstacles which are invisible to the robot will also be included as "dynamic obstacles" including but not limited to obstacles that appear or disappear in regards to the mobile robotic device's sensors such as infrared, depth camera or any other sensor type included with the robot and the like.

Some embodiments include a method for mobile robotic devices to autonomously make decisions regarding the most efficient navigational and work duty plan for a work environment. In some embodiments, considerations regarding dynamic obstacles, the type of work surfaces present, and other relevant considerations are factored into this decision making. A processor of the mobile robotic device processes probabilities and all collected data regarding the work environment in order to create the most efficient plan of operation for a work environment.

In some embodiments, during operation, the processor of the mobile robotic device utilizes machine learning to process probabilities and autonomously determine where the mobile robotic device should operate as well as what operations should be partaken in. Information pertaining to work surface types as well as the presence or absence of dynamic obstacles in work areas are some, but not all of the considerations utilized in making these decisions. In some embodiments, the processor of the mobile robotic device utilizes data from prior work cycles to determine a navigational plan as well as a plan for work duties to be conducted. In some embodiments, the plan factors in various considerations to determine the most efficient navigational and work plan for conducting work duties. While performing work duties, sensors on the mobile robotic device collect new data. If the data suggests that the mobile robotic is required to alter its work and navigational plan, the mobile robotic device will do so and store the new data for future use.

In some embodiments, dynamic obstacles and floor type are detected by the processor of the mobile robotic device during work operation. As the mobile robotic device operates in the work environment, sensors arranged on the mobile robotic device collect information such as a type of work surface being operated on. For instance, for a mobile robotic cleaning device, the type of work surface being operated on can be quite important. For example, if a room has a thick pile rug as well as wood flooring, then this information is important for the operation of the mobile robotic cleaning device. In such a situation the presence of two differing work surfaces may make the operation of the mobile robotic cleaning device difficult as it has to adjust itself when it transitions from the taller elevation rug to the lower elevation wood floor. Additionally, the type of cleaning in such a situation may be different. For example, the cleaning on rug versus the cleaning on a wood floor may require different functions and may even elevate the pressure on the robot. For example, when a mobile robotic cleaning device operates on a rug, it may require a higher suctioning power or the brush may need to spin faster than when it is cleaning on a wood floor. Since debris can become stuck deep in the rug higher suctioning power may be necessary over that of a wood floor. Alternatively, a mobile robotic cleaning device that can vacuum as well as mop would result in different functions based on the floor type as the mobile robotic cleaning device is not going to mop the carpet. Additionally, a user may not wish for a mobile robotic device to operate on certain floor types. For example, a mobile robotic device that enters the home to deliver packages. A user may wish for such a mobile robotic device to only operate on a tiled surface but not that of a carpeted floor as the mobile robotic device would potentially track in dirt from outside and tile is easier to clean than carpet.

In some embodiments, as the mobile robotic device traverses the work environment the processor records the types of work surfaces in the work environment the mobile robotic device is operating in and where those work surfaces are located. The processor accesses this information during a live work cycle in order to assist with decision making. In some embodiments, to maximize the efficiency of a work operation of the mobile robotic device, the processor of the mobile robotic device autonomously determines probabilities based on data it has collected over time regarding the work surface types in rooms and what rooms it should operate in to maximize operational efficiency. For example, for a mobile robotic cleaning device, the processor may determine it is more efficient to clean the bedrooms first as they consist of a single work surface type, for example a carpeted surface, while other rooms contain multiple types of work surfaces and transitioning between multiple surface types would be burdensome and time consuming for the mobile robotic cleaning device. Further, in a similar situation, the processor of the mobile robotic cleaning device may determine that the robot should clean a hallway first as it consists of a wood floor and the wood floor can be cleaned quicker than rooms where the floor consists solely of carpet. Rooms with multiple floor types may be burdensome for the mobile robotic device. For example, for devices such as mobile robotic cleaning devices, operating in a room with multiple floor surface types may be burdensome for the robot because the robot must transition itself between different surface types resulting in different functionality, physically putting pressure on the robot, as well as lowering battery efficiency. As the robot traverses each edge or boundary from one surface type to another the mobile robotic cleaning device may need to switch the amount of power it utilizes to clean the different surface types by, for example, increasing suction power or brush rotation speed thereby wasting time and energy each time the robot transitions. Further, transitioning between different surface types may impact the angle of the mobile robotic cleaning device resulting in the brush and suction section missing contact with the work surface for a period of time as the robot is at an awkward angle during this transition period. In some embodiments, the mobile robotic cleaning device finishes cleaning a single surface type at a time before moving onto a different work surface type. With each cycle, the processor compiles such data to assist with decision making during the next operational cycle.

Figure 1:
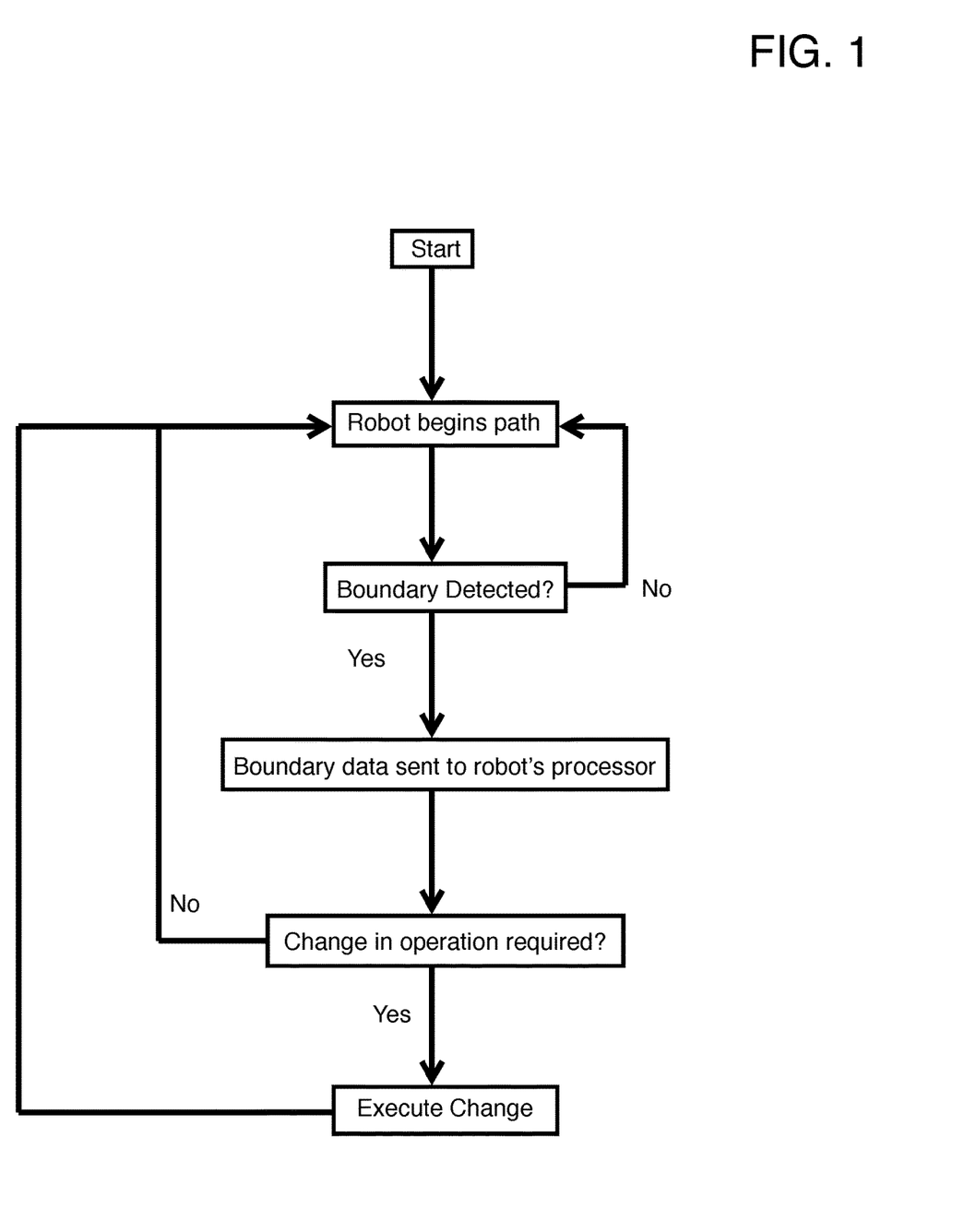
FIG. 1 illustrates the process by which a mobile robotic device detects a boundary edge between multiple work surface types and how it deals with the data collected, according to some embodiments.
Figure 2:
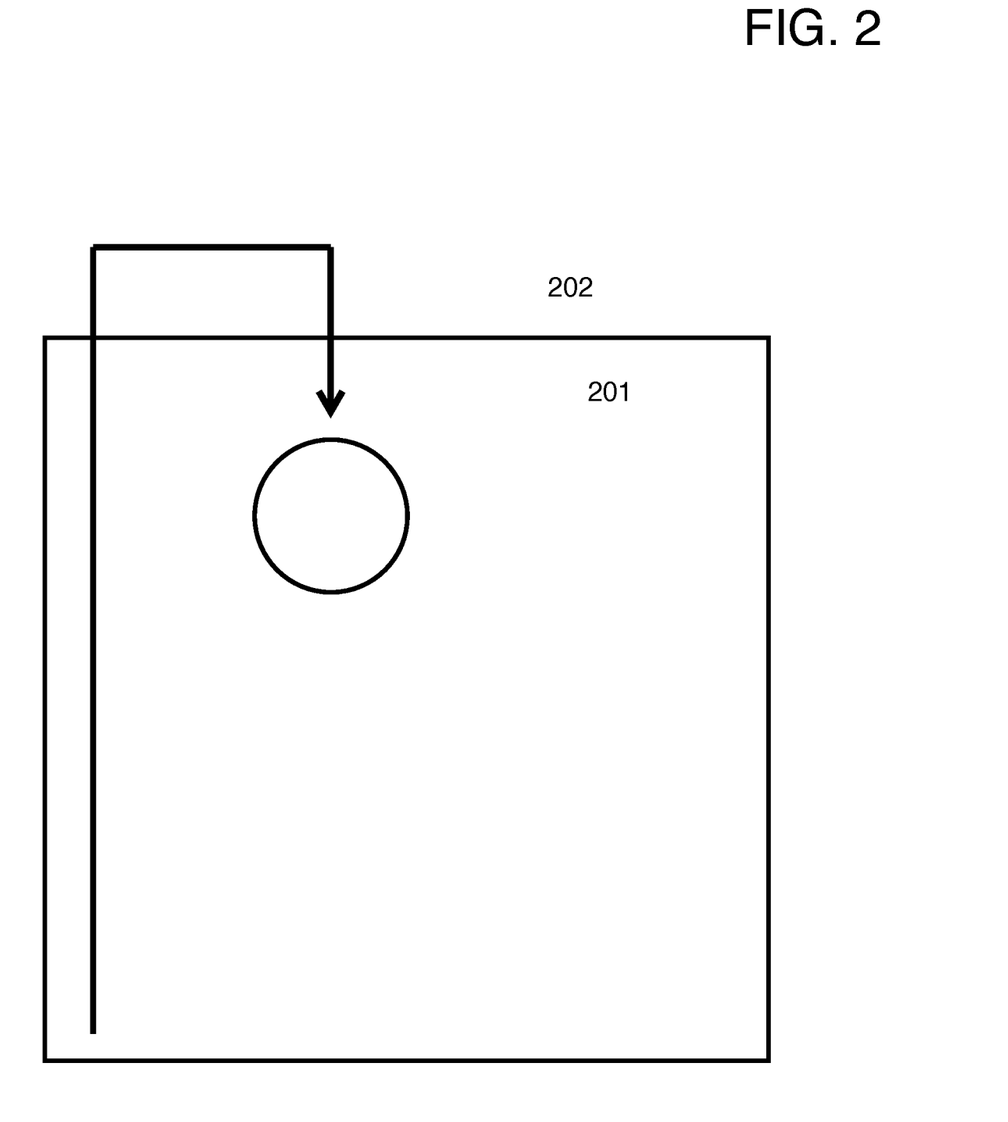
FIG. 2 illustrates an example of a mobile robotic device learning the boundary between two different work surface types, according to some embodiments.
Figure 3:
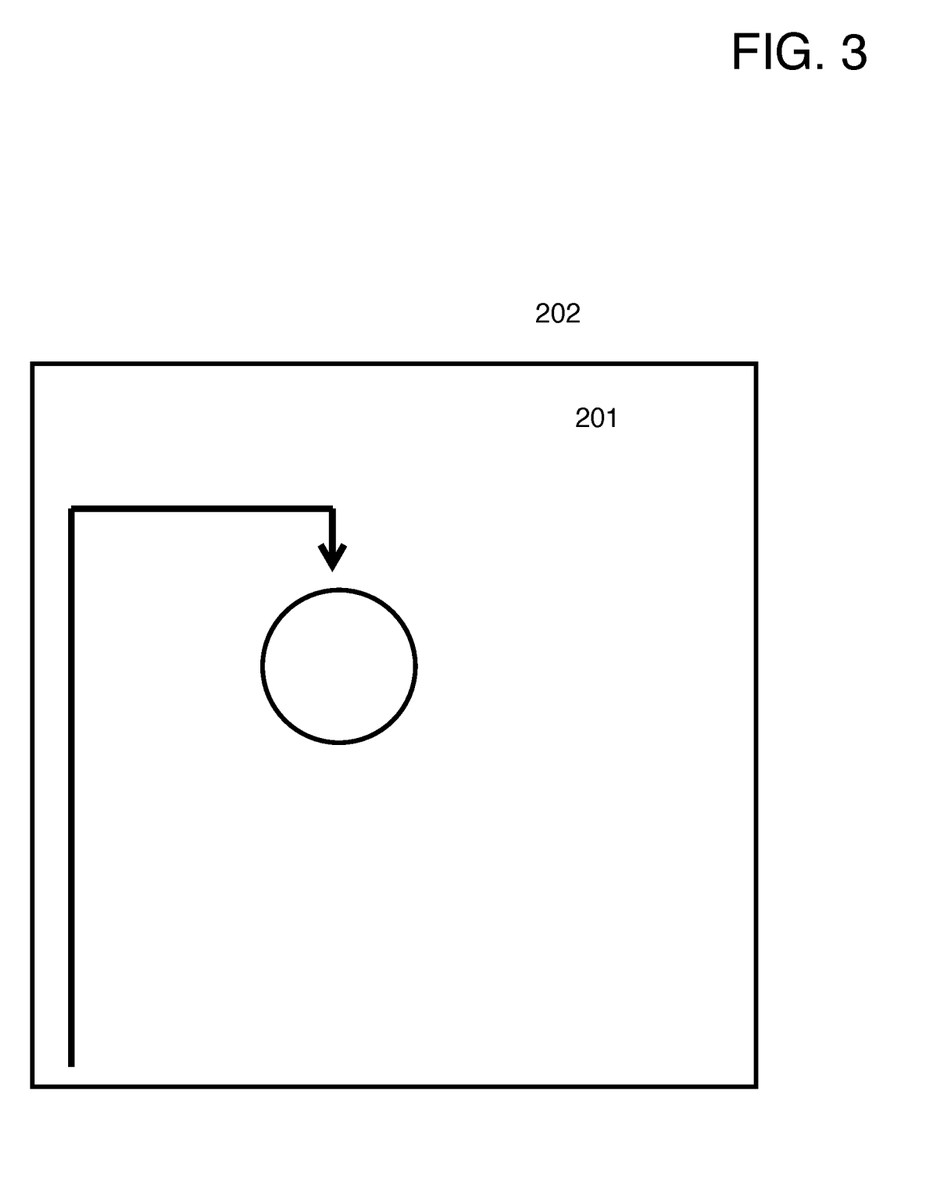
FIG. 3 illustrates an example of a mobile robotic device learning the boundary between two different work surface types, according to some embodiments.
Figure 4:
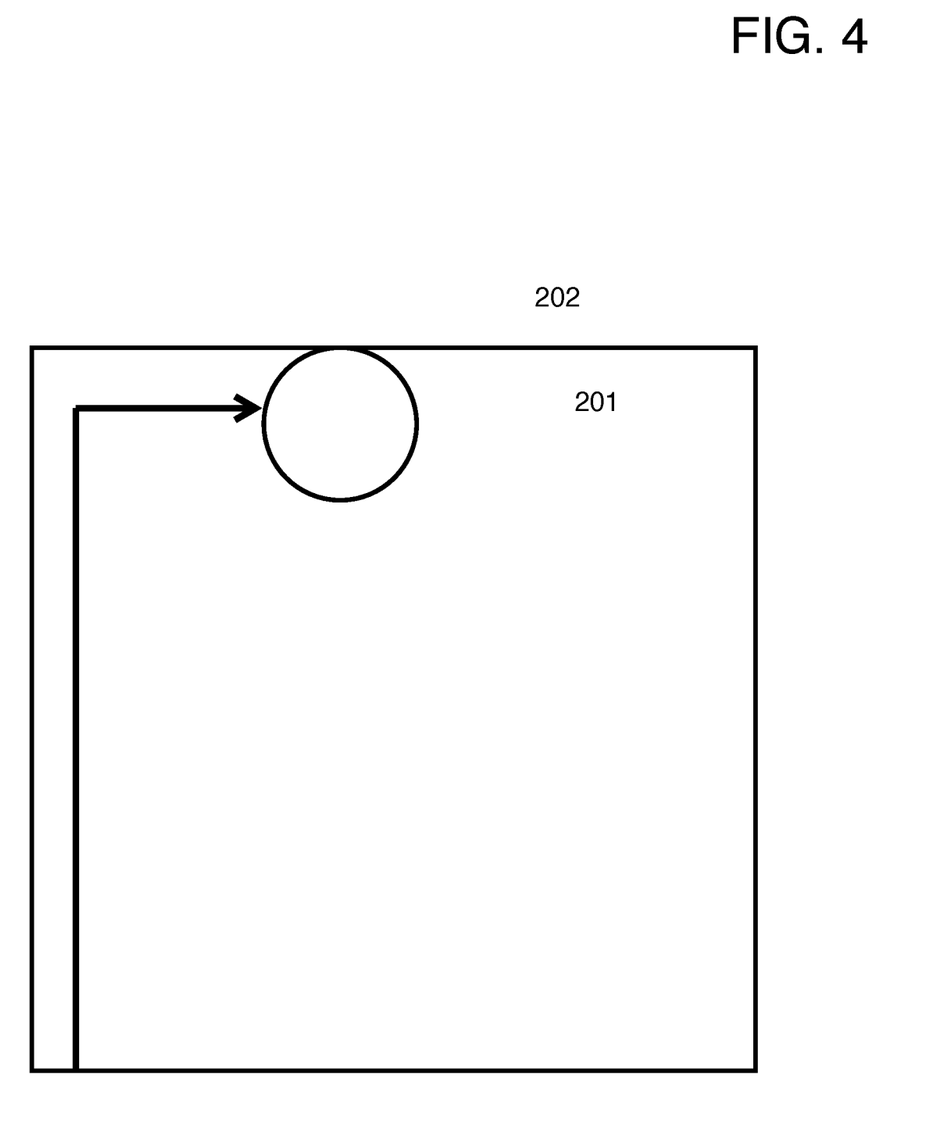
FIG. 4 illustrates an example of a mobile robotic device learning the boundary between two different work surface types, according to some embodiments.

In some embodiments, the mobile robotic device may operate on a single work surface type at a time even if multiple surface types are present in the same work area. For example, for a mobile robotic cleaning device, the mobile robotic cleaning device may determine that it is preferable to operate on rug before transferring to a wood floor. For a mobile robotic device that carries items, for example, the processor may determine that it is preferable for the robot to operate on a single surface type if it is carrying delicate materials as alternating between different surface types may make the items it is carrying unstable and susceptible to breaking when the mobile robotic device encounters the elevation change between the different surface types at their boundary or edge. Whatever the situation, during the course of normal operation the processor of the mobile robotic device learns the boundaries and edges between different work surface types. This process is demonstrated in FIG. 1. The processor of the mobile robotic device learns the boundaries between different surface types over a period of time as the robot performs multiple operational cycles in a given area. For example, as seen in FIG. 2, on a first day a mobile robotic cleaning device is attempting to completely clean a rug 201 that sits on top of a wood floor 202. The robot may clean beyond the boundary of the rug 201 and clean a small amount of the wood floor 202. The processor of the robot learns where the boundary is and stores this data. During the next cleaning cycle, after accessing the previous data, the mobile robotic cleaning device may once again clean beyond the boundary but the error margin may be smaller than on the first day. On a third day, the mobile robotic cleaning device may clean too short of the boundary between the rug 201 and wood floor 202, as seen in FIG. 3. Ultimately all of this data is compiled. On a fourth day, the mobile robotic device may then get the boundary right and only clean the rug area 201 but not the wood floor 202, as seen in FIG. 4. In some embodiments, the mobile robotic device may completely clean one work surface type before transferring over to clean the second work surface type. In some embodiments, the processor of the mobile robotic device compiles the data from each cleaning cycle to assess probabilities about where the robot should clean. The days for the processor of the mobile robotic device to learn the boundaries and edges of work surfaces are not intended to be predetermined. They are to be machine learned and the processor learns them at its own individual pace.

In some embodiments, the processor of the mobile robotic device autonomously generates a map based on the collected data of the work environment compiled over time. The processor creates and updates the map with new data after each additional work cycle.

In some embodiments, in an environment where multiple mobile robotic devices are present, the mobile robotic devices may share information pertaining to the specific location, type of work surface, as well as internal maps generated, and historical operational data with each other. In some embodiments, the processor of the mobile robotic device may learn the boundaries of work surfaces from the data shared from other mobile robotic devices. In some embodiments, the processor of the mobile robotic device confirms the boundary edges between surface types learned from other mobile robotic devices during normal working operation. In some embodiments, the processor of the mobile robotic device autonomously learns the boundaries between varying work surface types on its own even after boundaries have been shared by other mobile robotic devices.

In some embodiments, a user may use an application paired with the mobile robotic device. The user can thereafter diagram in a given work area where different work surface types are located in order to assist the mobile robotic device with detecting such work surfaces. The mobile robotic device will thereafter anticipate a work surface change before it encounters it for that location in the room. In some embodiments, the processor of the mobile robotic device autonomously learns the specific boundaries between varying work surface types despite the user marking the different work surface types.

Another aspect of the mobile robotic device operating at peak efficiency deals with interaction with dynamic obstacles. A mobile robotic device may act as a nuisance or safety hazard to dynamic obstacles such as a human and a pet and may interfere with the operation of other mobile robotic devices. In such a situation, it may be undesirable for the mobile robotic device to operate in the same vicinity at such a time. Additionally, dynamic obstacles may interfere with the operation on the part of the mobile robotic device itself. Therefore, to operate at peak efficiency, the mobile robotic device may attempt to limit interaction with dynamic obstacles when in operation if the interaction may cause issues.

In some embodiments, the processor of the mobile robot device marks the locations of obstacles, including dynamic obstacles, the robot has encountered in an internally generated map. In some embodiments, each time an obstacle is encountered the processor marks the location and nature of the obstacle on the internal map. In some embodiments, if an obstacle repeatedly appears over time, the processor of the mobile robotic device marks the obstacle as a permanent obstacle in the environment. In such a situation, the mobile robotic device expects the obstacle to be present during work operation. In some embodiments, in a situation wherein the obstacle is not present, the processor records the missing obstacle. In some embodiments, if this repeatedly occurs the processor marks the missing obstacle as a dynamic obstacle. In some embodiments, in a situation wherein the mobile robotic device may expect an area to not have an obstacle at all and one appears, the processor marks the obstacle as dynamic. In some embodiments, if an obstacle appears on some occasions but not others the processor marks the obstacle as a dynamic obstacle. In some embodiments, the processor of the mobile robotic device may mark obstacles that are unexpected, have disappeared or have unexpectedly appeared as dynamic obstacles.

In some embodiments, a mobile robotic device may encounter obstacles it has not encountered before in a location but which is close to where it routinely encounters obstacles. An example is a dining room chair. If the chair has been moved to a location that is close to where it is usually located but not a far distance, for example a foot or so, then the processor of the mobile robotic device may anticipate that this is merely the same chair that has been slightly moved out of place. In such a situation, the distance is not a predetermined distance but is up to the processor to autonomously determine whether or not to label such an obstacle as dynamic or not.

In some embodiments, when the mobile robotic device encounters dynamic obstacles that are moving, such as other mobile robotic devices, pets, humans and the like, the mobile robotic device will collect this data. The data collected may include but is not limited to what time this occurred, the date this occurred, where this occurred such as what room this occurred in, what was likely encountered such as whether this was a mobile robotic device, human, pet, piece of furniture or the like, and any other relevant information that the processor of the robot can utilize for cataloguing the encounter.

In some embodiments, when the mobile robotic device encounters an obstacle that is invisible to it, for example an obstacle that the sensors on the mobile robotic device were not able to detect, the mobile robotic device may catalog that obstacle as a dynamic obstacle.

In some embodiments, in areas with multiple historical occurrences of dynamic obstacles, the mobile robotic device will expect such a location to be a high volume traffic location. In some embodiments, the mobile robotic device catalogues data in regards to when these instances occur. For example, at 6 PM a mobile robotic device may encounter multiple humans in a kitchen or dining area on multiple occasions. In such a situation, the processor of the mobile robotic device internally note these encounters including information such as encountering multiple dynamic obstacles, the location of kitchen or dining area for the encounters, the time of 6 PM for the encounters, and the number of occasions the encounters occurred. In some embodiments, the processor of the mobile robotic device may rely on this information for future work cycles.

Figure 5:
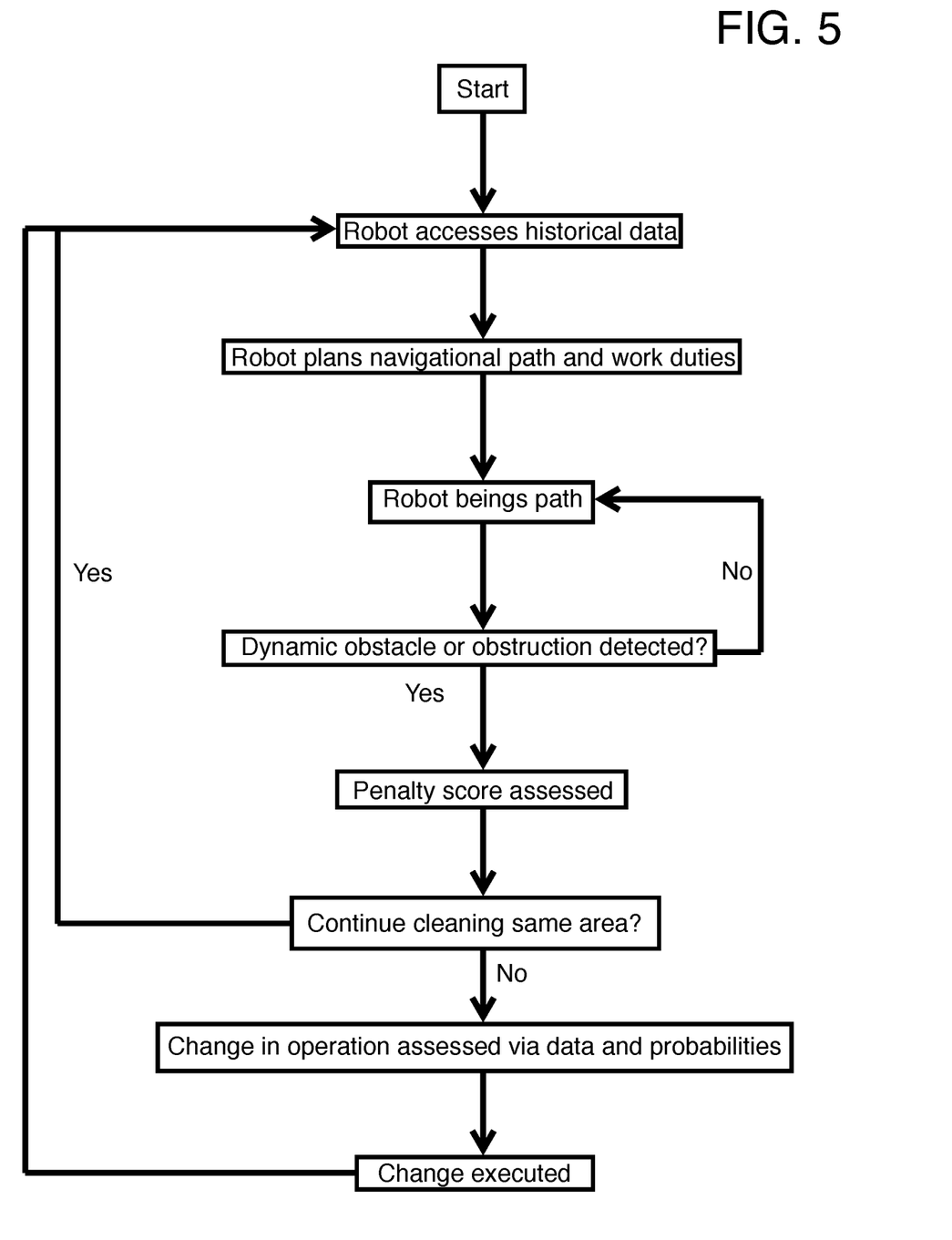
FIG. 5 illustrates how a mobile robotic device detects a dynamic obstacle in the work environment and the response process to such a detection, according to some embodiments.

In some embodiments, the presence of dynamic obstacles over a period of time is measured. In some embodiments, utilizing machine learning, the processor of the mobile robotic device processes probabilities and a number between 1 and 10 is assessed as a penalty score to a given room or work area to aid in determining what area is preferable to clean first. For example, if the mobile robotic device encounters a dynamic obstacle such as multiple individuals in a room at the same time on a given day, it may assign a high penalty score for that room. At such a time, the mobile robotic device may leave the room and attempt to operate job duties in a different room before returning to complete job duties in the room it previously assessed a high score for. On its way to or from the room with the high score, the mobile robotic device may encounter other rooms as well. When this occurs, the mobile robotic device may check on these other rooms. If the mobile robotic device checks these other rooms, it may enter and assess whether or not it is an optimal time to perform job duties in these rooms based on the presence of dynamic obstacles. If a dynamic obstacle is encountered a penalty score may be assessed for this particular time on the particular day for this particular room. The processor of the mobile robotic device may then determine whether or not to conduct a work duty in that room or whether to move on to another room. In some embodiments, over a predetermined amount of time, the penalty scores for rooms that have been assessed a penalty are reduced at a fixed rate over a fixed time interval. In some embodiments, the penalty scores for rooms are reduced every time the mobile robotic device performs a work duty in a different room. In some embodiments, when the penalty score for a particular room is lowered and reaches below a predetermined threshold, the mobile robotic device returns to the room with the lowered penalty score and attempts to perform work duties again in that room. In some embodiments, the mobile robotic device may encounter other rooms on the way to the room with the lowered penalty score and may attempt to perform job duties in those rooms first. If the robot returns to the room with lowered penalty score and encounters dynamic obstacles again, the processor of the mobile robotic device once again assesses a penalty score for the room and continues on to additional rooms. FIG. 5 demonstrates the process by which the processor of the mobile robotic device addressed the presence of dynamic obstacles.

In some embodiments, the mobile robotic device may avoid areas at particular times where historical data indicates the existence of a high volume of traffic or high likelihood of dynamic obstacles. For example, a mobile robotic cleaning device in a home running between 5 and 7 PM may avoid the kitchen and dining areas around 6 PM as the processor expects the robot to encounter humans. Instead, at 6 PM the processor of the mobile robotic cleaning device may deem it better to clean an office, bedroom, or other low traffic volume areas before returning to clean the kitchen and dining areas at 7 PM when the humans are no longer present.

In some embodiments, a user uses an application paired with the mobile robotic device to mark where items in a room are located. For example, for a dining area, a user marks where the table and chairs are located. In such a situation, when entering a given room, the mobile robotic device anticipates such obstacles to be in the room and the processor does not mark them as dynamic obstacles even if the robot has never encountered them before.

In some embodiments, a user uses an application paired with the mobile robotic device to indicate presence of humans, other mobile robotic devices, pets, or other dynamic obstacles in the area.

In some embodiments, in an environment where multiple mobile robotic devices are present, the mobile robotic devices may share information pertaining to the specific location, presence of dynamic obstacles, internal maps generated, and historical operational data with each other.

In some embodiments, the work area map including locations of rooms and layout is an important factor in regards to the peak efficiency of operation for the mobile robotic device. Based on the location of rooms or map layout the processor of the mobile robotic device may determine that the robot operate in particular rooms first as traveling to distant rooms is burdensome and consumes time and battery life. For example, for a mobile robotic cleaning device, it is determined that there is a high probability of a dynamic obstacle in a home office at a particular time but that there is a very low likelihood of a dynamic obstacle in bedroom 3, therefore the processor of the mobile robotic cleaning device determines to clean bedroom 3. However, in a map layout, bedroom 3 may be several rooms away. Therefore, in the interest of operating at peak efficiency, the mobile robotic cleaning device attempts to clean the hallway and bedrooms 1 and 2 on the way to bedroom 3. In an alternative situation, if the mobile robotic cleaning device determines that on the way to bedroom 3 that the hallway and bedroom 1 have a low probability of a dynamic obstacle but that bedroom 2 has a medium probability of a dynamic obstacle then the robot attempts to clean the hallway and bedroom 1 before checking on bedroom 2 to see if there is a dynamic obstacle present on the way to bedroom 3. In the same scenario, the mobile robotic device may simply determine to clean the hallway and bedroom 1 before skipping bedroom 2 on the way to cleaning bedroom 3. Once bedroom 3 has been cleaned the mobile robotic device may come back to check to see if bedroom 2 should be cleaned.

In some embodiments, in order to maximize efficiency, the amount of battery power left may play a factor in determining which work tasks and navigation patterns to perform. For example, for a mobile robotic cleaning device, if only one quarter battery life remains, the processor of the mobile robotic cleaning device may utilize this information to determine which work tasks to perform. For example, if a mobile robotic cleaning device has the option of cleaning a hallway with a wood surface, or cleaning a large living room with multiple surface types, the processor may determine based on battery power left that it would be optimal for the robot to completely clean the hallway and then recharge itself as the living room with multiple surface types would drain the battery to the point that the mobile robotic device would not be able to completely clean the room before charging. In some embodiments, the location of the mobile robotic device's docking or charging station may play a factor in the autonomous task decision making process of the mobile robotic device. For example, if a mobile robotic device has multiple tasks assigned but cannot complete all of them before it must recharge itself, the processor may determine the best actions to complete are those nearest to the docking or charging station rather than those which are farther away.

In some embodiments, when tasks were last completed in a given room may impact the autonomous decision process of the mobile robotic device. For example, for a mobile robotic cleaning device, the fact that some rooms were cleaned several weeks ago while others were cleaned only a week ago may impact the decision making process. In such a situation, the processor of the mobile robotic device may factor in and prioritize those work duties which have not been completed in quite some time over those that have been more recently completed.

In some embodiments, the processor of the mobile robotic device may determine decisions based on the amount of activity that takes place in a given room. For example, for a mobile robotic cleaning device, if human activity takes place more often in the living room than in a home office, the mobile robotic cleaning device may prioritize cleaning the living room on a more consistent basis as it will get dirty more quickly. Additionally, in some embodiments, for a mobile robotic cleaning device, historical data pertaining to the amount of debris historically collected in various locations may be considered into the prioritization of cleaning particular rooms over others.

In some embodiments, once this data has been catalogued it may be made available to a user. In some embodiments, a user may select areas for the mobile robotic device to operate in and the actions the mobile robotic device partakes in.

With all of this information compiled over time, the processor of the mobile robotic device determines the most efficient navigational and work duty plan autonomously. The processor determines which rooms to operate in and tasks to perform. For example, for a mobile robotic cleaning device, the compiled data impacts which rooms to clean, how to navigate to them, which type of cleaning to perform in them, and when to clean them. In some embodiments, the processor of the mobile robotic device autonomously creates a cleaning scheduling. Utilizing machine learning to process various probabilities, the scheduling focuses on achieving the most efficient manner for work tasks possible for the mobile robotic device. The data compiled over time includes, for example, work surface types, room locations, the presence or absence of dynamic obstacles, battery life and other relevant and the like data. In some embodiments, the processor of the mobile robotic device adds data from each cleaning cycle. If new data emerges from a given cleaning cycle that is different from prior historical data, it may impact how the mobile robotic device operates in future work cycles.

While this invention has been described in terms of several embodiments, there are alterations, permutations, and equivalents, which fall within the scope of this invention. It should also be noted that there are many alternative ways of implementing the methods, devices and apparatuses of the present invention. Furthermore, unless explicitly stated, any method embodiments described herein are not constrained to a particular order or sequence. Further the Abstract is provided herein for convenience and should not be employed to construe or limit the overall invention, which is expressed in the claims. It is therefore intended that the following appended claims to be interpreted as including all such alterations, permutations, and equivalents as fall within the true spirit and scope of the present invention.

The invention claimed is:

1. A method for a robot to autonomously plan a navigational route and work duties in an environment of the robot, comprising:
   accessing, with a processor of the robot, historical sensor data stored from prior work cycles, wherein the historical sensor data is indicative of at least one of: a map of an environment of the robot and one of: types of work surfaces in areas of the environment, locations of rooms in the environment, locations of obstacles in the environment, presence and absence of dynamic obstacles in areas of the environment at different times, a location of a charging station of the robot, an amount of debris accumulation in areas of the environment, an activity level in areas of the environment at different times, a battery power level of the robot, or a last date of operation in areas of the environment;
   determining, with the processor, the navigational route and work duties of the robot by processing probabilities based on the historical sensor data;
   enacting, with the robot, the navigational route and work duties;
   capturing, with at least one sensor of the robot, new sensor data while enacting the navigational route and work duties;
   processing, with the processor, the new sensor data; and
   altering, with the processor, the navigational route and work duties based on the new sensor data processed.

2. The method of claim 1, further comprising:
   enacting, with the robot, a new and more efficient navigational route and work duties in a next work cycle.

3. The method of claim 1, further comprising:
   displaying, with an application of a communication device, a map of the environment;
   receiving, with the application, an input designating at least one of: a work surface type of an area in the map, a location of a type of object in the map, a type of an object in the map, a location and presence of dynamic obstacles in the map, an activity level of an area in the map, debris accumulation of an area in the map, an area in the map that the robot is to operate in, and an action the robot is to execute; and
   transmitting, with the application, at least one of: a work surface type of an area in the map, a location of a type of object in the map, a type of an object in the map, a location and presence of dynamic obstacles in the map, an activity level of an area in the map, debris accumulation of an area in the map, an area in the map that the robot is to operate in, and an action the robot is to execute to the processor of the robot.

4. The method of claim 1, further comprising:
   receiving, with the processor, at least one of: a work surface type of an area in the map, a location of a type of object in the map, a type of an object in the map, a location and presence of dynamic obstacles in the map, an activity level of an area in the map, debris accumulation of an area in the map, an area in the map that the robot is to operate in, and an action the robot is to execute from an application of a communication device paired with the robot.

5. The method of claim 1, wherein determining the navigational route and work duties comprises:
 determining, with the processor, a navigational route and work duties that minimizes traversing areas with high likelihood of posing operational issues to the robot.

6. The method of claim 1, wherein altering the navigational route and work duties reduces the likelihood of interaction with a human or a pet.

7. The method of claim 1, further comprising:
 marking, with the processor, an obstacle as a permanent obstacle in a location of the environment despite sensors of the robot being unable to detect the obstacle in the location; and
 altering, with the processor, the navigational path to navigate around the marked location of the permanent obstacle.

8. The method of claim 1, further comprising:
 detecting, with the processor, an obstacle based on at least some sensor data collected by the at least one sensor; and
 determining, with the processor, the obstacle is a permanent obstacle or a dynamic obstacle.

9. The method of claim 1, further comprising:
 determining, with the processor, at least one of a particular day and a particular time in which one or more dynamic obstacles are present and absent in different areas of the environment; and
 executing, with the processor, the navigational path of the robot and work duties based on the particular day and the particular time the dynamic obstacles are absent.

10. The method of claim 1, wherein the robot stops operating or skips operating in an area within which one or more dynamic obstacles is detected.

11. The method of claim 10, wherein the robot returns at a later time when no dynamic obstacles are detected for operation.

12. The method of claim 10, wherein the dynamic obstacles comprise at least one of a human and a pet.

13. The method of claim 1, further comprising:
 determining, with the processor, an activity level of an area of the environment during at least one of a particular day and a particular time based on at least some of the sensor data collected by the at least one sensor; and
 determining, with the processor, which areas of the environment to clean based on the activity levels of areas of the environment.

14. The method of claim 13, wherein at least one of:
 the robot cleans areas with higher activity level more often than areas with lower activity level; and
 the robot cleans areas at the particular day and the particular time the areas have lower activity level.

15. The method of claim 1, wherein the robot performs at least one of mopping and vacuuming.

16. The robot of claim 1, wherein the operations further comprise:
 receiving, with the processor, at least one of work surface type data, work surface transition data, obstacle or object data, maps of the environment, and historical operation data from at least one other robot; and
 transmitting, with the processor, work surface type data, work surface transition data, obstacle or object data, maps of the environment, and historical operation data to at least one other robot.

17. The method of claim 1, further comprising:
 generating or updating, with the processor, a map of the environment based on at least some of the sensor data collected by the at least one sensor;
 detecting, with the processor, a work surface type of an area of the environment and at least one obstacle based on at least some of the sensor data collected by the at least one sensor;
 recording, with the processor, the work surface type of the area and the at least one obstacle in the map of the environment; and
 adjusting, with the processor, a suction power or a brush speed of the robot based on at least a work surface type of an area operated on by the robot.

18. The method of claim 1, further comprising:
 determining, with the processor, an amount of debris accumulation in an area of the environment based on at least some of the sensor data collected by the at least one sensor; and
 determining or altering, with the processor, the navigational path of the robot and work duties or an order of cleaning areas of the environment based on the amount of debris accumulation in areas of the environment.

19. A robot, comprising:
 a chassis;
 a set of wheels coupled to the chassis;
 a plurality of sensors;
 a processor;
 a tangible, non-transitory, machine readable medium storing instructions that when executed by the processor effectuates operations comprising:
  accessing, with the processor, historical sensor data stored from prior work cycles, wherein the historical sensor data is indicative of at least one of: a map of an environment of the robot and one of: types of work surfaces in areas of the environment, locations of rooms in the environment, locations of obstacles in the environment, presence and absence of dynamic obstacles in areas of the environment at different times, a location of a charging station of the robot, an amount of debris accumulation in areas of the environment, an activity level in areas of the environment at different times, a battery power level of the robot, or a last date of operation in areas of the environment;
  determining, with the processor, a navigational route and work duties of the robot by processing probabilities based on the historical sensor data;
  enacting, with the robot, the navigational route and work duties;
  capturing, with the plurality of sensors, new sensor data while enacting the navigational route and work duties;
  processing, with the processor, the new sensor data; and
  altering, with the processor, the navigational route and work duties based on the new sensor data processed.

20. A tangible, non-transitory, machine readable medium storing instructions that when executed by a processor effectuates operations comprising:
 accessing, with a processor of the robot, historical sensor data stored from prior work cycles, wherein the historical sensor data is indicative of at least one of: a map of an environment of the robot and one of: types of work surfaces in areas of the environment, locations of rooms in the environment, locations of obstacles in the environment, presence and absence of dynamic obstacles in areas of the environment at different times, a location of a charging station of the robot, an amount of debris accumulation in areas of the environment, an activity level in areas of the environment at different times, a battery power level of the robot, or a last date of operation in areas of the environment;

determining, with the processor, a navigational route and work duties of the robot by processing probabilities based on the historical sensor data;

enacting, with the robot, the navigational route and work duties;

capturing, with at least one sensor of the robot, new sensor data while enacting the navigational route and work duties;

processing, with the processor, the new sensor data; and altering, with the processor, the navigational route and work duties based on the new sensor data processed.

* * * * *